(12) United States Patent
Sladen

(10) Patent No.: US 7,113,232 B2
(45) Date of Patent: Sep. 26, 2006

(54) DISPLAY WINDOW AND ASSEMBLY

(75) Inventor: Peter Sladen, Winchester (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/023,732

(22) Filed: Dec. 21, 2001

(65) Prior Publication Data

US 2002/0085131 A1    Jul. 4, 2002

(30) Foreign Application Priority Data

Dec. 29, 2000    (GB) .................................. 0031830.3

(51) Int. Cl.
G02F 1/1335    (2006.01)

(52) U.S. Cl. ..................... 349/16; 349/62; 349/63; 362/623

(58) Field of Classification Search .................. 349/16, 349/95, 61–63, 12, 65, 67, 113, 114, 5, 57; 362/24, 603, 606, 620, 626, 551, 613, 623
See application file for complete search history.

(56) References Cited

U.S. PATENT DOCUMENTS

| 4,527,862 A | * | 7/1985 | Arakawa ...................... 349/12 |
| 6,020,945 A | * | 2/2000 | Sawai et al. ................. 349/119 |
| 6,243,150 B1 | * | 6/2001 | Watanabe et al. ............. 349/65 |
| 6,398,379 B1 | * | 6/2002 | Imai ............................. 362/24 |
| 6,456,279 B1 | * | 9/2002 | Kubo et al. .................. 345/173 |
| 6,504,582 B1 | * | 1/2003 | Li et al. ....................... 349/12 |
| 6,671,013 B1 | * | 12/2003 | Ohkawa ....................... 349/62 |
| 6,742,907 B1 | * | 6/2004 | Funamoto et al. .......... 362/625 |

FOREIGN PATENT DOCUMENTS

| DE | EP 1063561 A1 | * | 12/2000 |
| EP | 1 063 561 | | 12/2000 |
| EP | 1122586 | | 8/2001 |
| GB | 2 348 040 | | 9/2000 |
| JP | 6-34961 | | 2/1994 |
| JP | 10153777 | | 6/1998 |
| JP | 11194339 | | 7/1999 |
| JP | 11-326898 | | 11/1999 |
| JP | 155218 | | 6/2000 |
| JP | 2001-215312 | * | 10/2001 |
| WO | 0184228 | | 11/2001 |

OTHER PUBLICATIONS

European Search Report.
English Language Abstract EP1063561.
English Language Abstract JP11326898.
English Language Abstract JP6034961.

* cited by examiner

Primary Examiner—Andrew Schechter
Assistant Examiner—Thoi V. Duong
(74) Attorney, Agent, or Firm—Alston & Bird LLP

(57) ABSTRACT

A display window for placement in registration with a display is disclosed. The display is viewable through the window. A first surface of the window is for exposure to a user, and a second surface of the window is for placement adjacent the display. The second surface is provided with a grating to distribute light from an associated source of illumination in the direction of the display. Also disclosed is a display assembly and a portable telephone.

22 Claims, 4 Drawing Sheets

DISPLAY WINDOW AND ASSEMBLY

BACKGROUND OF THE INVENTION

This invention relates to an improved window for a display device, and associated display assembly. The invention has a range of possible uses in handheld or portable devices such as portable telephones, remote control units, laptop computers or personal audio equipment, as well as in larger fixed items such as microwave ovens and industrial machines.

Liquid Crystal Displays (LCDs) are well known display devices and are used for indicating status information in a wide range of everyday devices. Unlike some other display devices such as Light Emitting Diodes (LEDs) or Cathode Ray Tubes (CRTs), they do not inherently emit any light themselves.

LCD displays, therefore, are either only usable in situations where there is sufficient incident light falling upon them, or else where the device is equipped with suitable lighting facilities of its own.

One form of lighting is backlighting, which can only be used with certain types of LCDs. Backlighting, though, can be quite inefficient due to the number of layers making up the display through which the light has to pass. For instance, a typical LCD display comprises at least: two layers of glass, two layers of polarising film, two layers of electrodes and the actual liquid crystals themselves. The polarising films can account for a loss of more than 50% of the transmitted light. In total, a monochrome LCD may only transmit 10% of the light emitted from the backlight. The situation becomes even worse for colour LCDs which may transmit less than 5% of the light emitted from the backlight. A typical LCD 10 is shown at FIG. 1. The structure of the LCD is seen to consist of several layers. The outermost layer, and the side from which the display is viewed, is the polarising layer 15. Immediately beneath that is a layer of glass 20. Disposed on the surface of the glass layer 20 is electrode layer 25. Situated between the electrode layer 25 and a further electrode layer 35 is a layer of liquid crystal material 30. The liquid crystal material is retained in position between glass layers 20 and 40 by seal 50. The final layer is a further polariser 45.

The operation of LCDs will be well known to the skilled man, and so will not be described in any detail here.

There are three basic modes of operation for LCD displays: reflective mode, transmissive mode and transflective mode.

In reflective mode LCDs, the lower layer consisting of the polariser 45 is effectively mirrored. This means that any light entering from the front of the display 15 is reflected outwards again. Such displays tend to offer the best brightness and contrast. Backlighting of such displays is not possible due to the reflective layer, which will not transmit light.

In transmissive mode LCDs, the polariser layer 45 has no reflective properties. For that reason, for the LCD display to display any information at all, a permanent backlight must be provided. This, of course, can place a considerable drain on battery-powered equipment, and so is not suitable for devices such as portable telephones.

Transflective mode LCDs operate midway between reflective and transmissive displays. The polariser layer 45 is provided with a coating providing partial reflectivity, and partial transmissivity. In situations where there is sufficient ambient light, the display is visible by that light alone. However, when the ambient light level is low, backlighting can be used to enable the displayed information to be visible.

With the advent of colour LCDs, the lighting problem becomes more pronounced. The presence of additional coloured filters into the layers shown in FIG. 1 further reduce the light passed by the display.

With colour displays, it is particularly desirable to be able to maintain a good display brightness and contrast. This is best achieved using a reflective mode display. However, such displays, as explained above, are not usable with backlighting, limiting their application in certain products, where good ambient lighting may not always be available.

It is possible to provide additional front-lighting for such displays, but this introduces further problems, such as ensuring the display is not obscured by the light sources.

A prior art technique of front lighting includes the structure as shown in FIG. 2, which shows a cross section through a display assembly 100. Display assembly 100 has the following parts: a display window 130; a light guide, or grating 120; an LCD component 110; and a light source 140.

The LCD component 110 operates in reflective mode and is a complete unit which may be obtained from a number of suppliers such as Sharp, Philips or Seiko. The LCD has electrical connections for connection to a processor for controlling the information displayable thereon. The LCD 110 may be of the order of several millimetres thick Disposed between the display window 130 and LCD 110 is a light guide or diffusion grating 120. This may be approximately 1 mm thick. The light guide 120 has the function of distributing the light from light source 140 and so illuminating the display from its front surface. Light Source 140 may be any convenient source such as an LED.

Disposed above the grating 120, and having its outer surface exposed to the user, the display window 130 is a substantially transparent plastics window, which may be approximately 1 mm thick. This may be treated on its exposed outer surface with a scratch resistant coating and/or an anti-reflective coating.

The purpose of the display window is to provide protection for the delicate structures of the grating 120 and LCD 110, while still allowing the LCD 110 to be visible through the window.

The display window 130, grating 120 and LCD 110 are separated from each other by a small distance, which may of the order of 0.1 to 0.5 mm by use of a gasket arranged between each layer and around the edge of each layer. The gasket may be made of a plastics or rubber material.

The separation between the various elements is to provide a degree of protection to them in case of the display assembly being knocked. The LCD 110 comprises glass, and is very delicate. The grating 110, having a very fine surface, can be easily damaged by any contact with other bodies. The display window is more rugged than the other components of the display and serves to protect them from inadvertent damage.

With many layers making up a display assembly, there is the possibility of internal reflections between the various layers causing display degradation. Such degradation may take the form of blurring of the image, and loss of contrast. In order to minimise the problem of internal reflections between the various layers, anti-reflective coatings may be added to some or all of the components of the assembly. The addition of such coatings adds to the cost of the display assembly.

The grating 120 is made from a plastics material, and has etched onto its surface an array of so-called microgrooves. The grooves may be formed by any conventional method.

Suitable methods are acid etching, laser etching, moulding and machine-removal of excess material.

The function of the microgrooves is to distribute the light coming from a light source 140 disposed to one or more sides of the grating. The microgrooves distribute the light downwards through approximately 90° so that it illuminates the LCD situated below. The light source is positioned substantially level with the light guide 120 as shown in FIG. 2.

The operation of the microgrooves is shown in FIGS. 3*a* and 3*b*. FIG. 3*a* shows a plan view of the light source and the grating, and FIG. 3*b* shows a cross-sectional view of the grating 120, light source 140 and LCD 100. The light source 140 is arranged to shine across the width of the grating 120 from the side of the grating as shown. When light from the light source hits each microgroove 125, it is reflected downwards towards the LCD 110 through the body of the light guide 120. The dimensions of each component have been greatly exaggerated for clarity, and only the operation of 3 microgrooves is illustrated. The microgrooves are in fact only a few microns wide, and run generally parallel in one direction across substantially the entire length of the grating.

Depending on the size of the display and luminosity of the light source, among other factors, more than one light source may be provided. For instance, in a monochrome mobile telephone display measuring 4 cm by 3 cm, two light sources may be required.

SUMMARY OF THE INVENTION

According to a first aspect of the present invention, there is provided a display window for placement in registration with a display so that the display is viewable through the window, wherein a first surface of the window is for exposure to a user, and a second surface of the window is for placement adjacent the display, the second surface being provided with a grating to distribute light from an associated source of illumination in the direction of the display.

According to a second aspect of the present invention, there is provided a display assembly comprising: a display; an illumination source; and a window disposed adjacent the display, and through which the display is viewable, wherein a surface of the window facing the display is provided with a grating for distributing light from the illumination source in the direction of the display.

According to a third aspect of the present invention, there is provided a portable telephone comprising: a housing; a light source; and a display, wherein the housing comprises a window with first and second surfaces, wherein the first surface defines an exterior surface of the portable telephone and the second surface, which faces the display, is provided with a grating for distributing light from the light source onto the display.

As mentioned, reflective LCDs offer greater brightness and contrast than alternative configurations, but cannot be backlit, requiring the use of front lighting when ambient light is insufficient.

Embodiments according to this invention allow front lighting to be more easily achieved, and hence the benefits of reflective mode LCDs to be more easily realised. One benefit of reflective mode LCDs is that they have a better ability to reflect ambient light than transflective LCDs, which are currently used in backlit displays. This means that a reflective mode LCD can be used in lower ambient light conditions than a transflective mode LCD, thus reducing the battery power used for lighting.

By incorporating the grating into the display window, various advantages are offered. There are fewer parts involved in the construction of a display assembly, and so the cost is reduced. Specifically, the need for a separate grating and one associated gasket is removed. Any decrease in component count can help to increase reliability and fewer parts reduces the amount of time required to construct a display assembly.

Preferably the display device is a Liquid Crystal Display (LCD), although other displays such as ZBD displays may benefit from embodiments of the invention.

Advantageously, any suitable form of grating or light guide may be incorporated into the display window. A particular example which provides suitable functionality includes a pattern appearing in cross-section as a series of triangular projections, for instance a sawtooth pattern.

In certain products, particularly portable telephones, there are requirements to continually decrease the volume of devices. Even a saving of a few millimetres in the height of a display assembly can be significant, and so any reduction in component count leading to a decrease in size is beneficial.

BRIEF DESCRIPTION OF THE DRAWINGS

For a better understanding of the present invention, and to understand how the same may be brought into effect, the invention will now be described, by way of example only, with reference to the appended drawings in which.

DETAIL DESCRIPTION OF THE INVENTION

The light source 140 is positioned approximately midway between the display window 200 and the LCD 110, and shines into the gap between them. The separation between the display window and the LCD is maintained through use of a suitable gasket. A typical separation may be of the order of 1 or 2 mm. The window is typically made from a polycarbonate material, although other plastics materials may also be used. The window is substantially transparent, at least to the extent that information displayed on the LCD is visible to the user.

Figure 4:
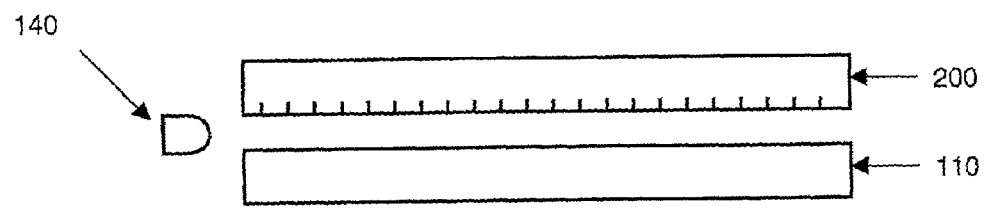
FIG. 4 shows a cross section through a display assembly according to embodiments of the invention.

In contrast to prior art displays, the assembly of FIG. 4 lacks a separate light guide or diffusion grating. Instead, the grating is incorporated with the display window 200.

The grating is incorporated into the display window on the opposite side to that exposed to the user in normal use. In this way, the integrity of the structure of the light guide can be preserved, as once assembled it will not be exposed to potential sources of harm.

The exact form of the light guide or grating can vary, provided that it is capable of performing the function of scattering the light produced from one or more discrete sources in the general direction of the LCD. The light sources will generally be situated around the edges of the display assembly, and arranged to shine into the gap between the window 200 and the LCD 110.

Figure 1:
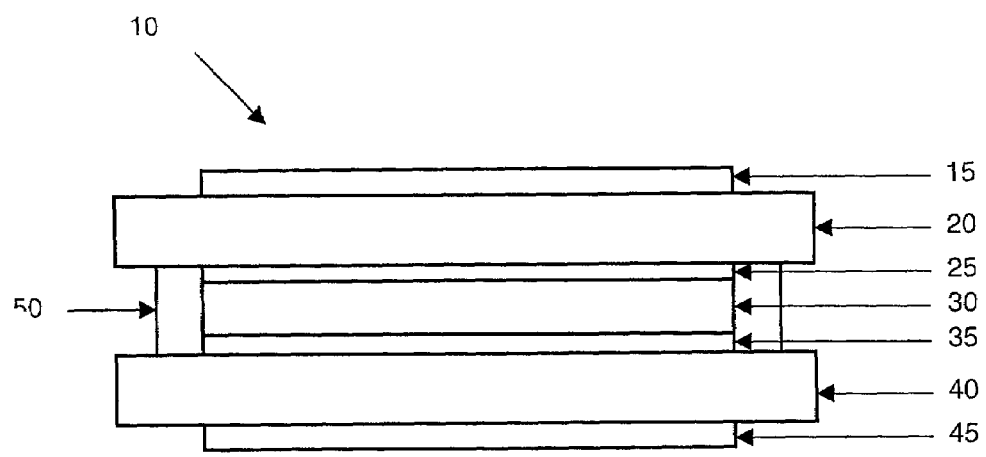
FIG. 1 shows a cross section through a conventional Liquid Crystal Display.
Figure 2:
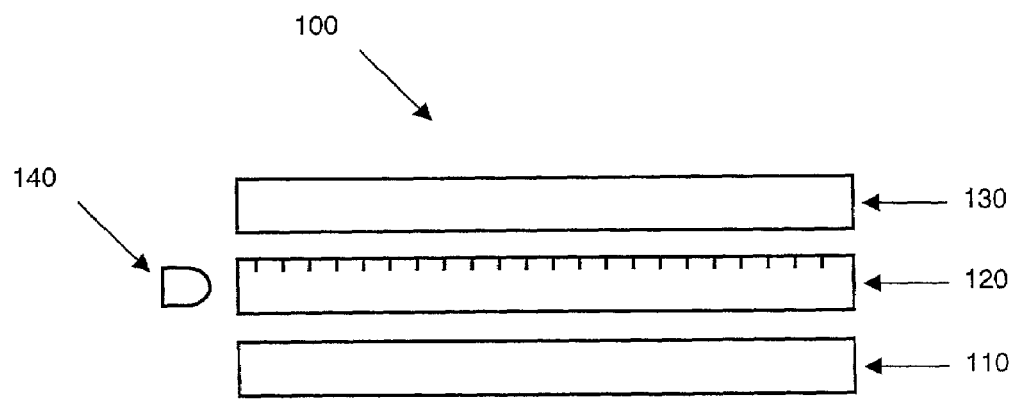
FIG. 2 shows a prior art arrangement for front lighting an LCD.
Figure 3A:
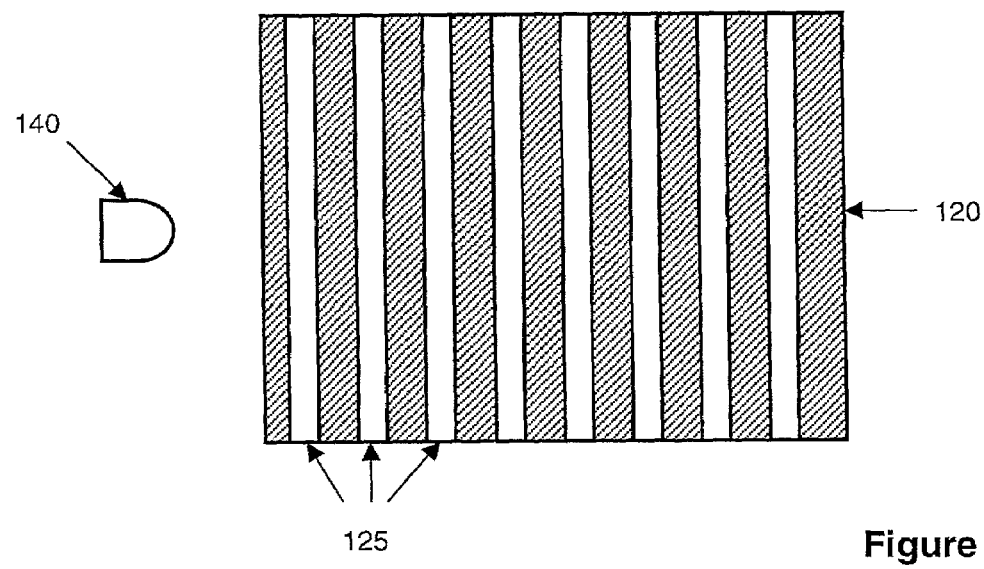
FIG. 3*a* shows a partial plan view of a prior art grating for lighting an LCD.
Figure 3B:
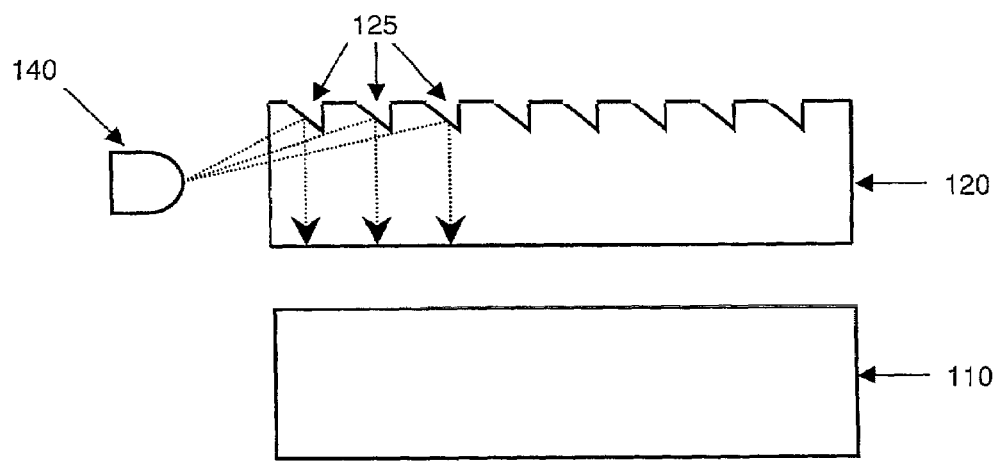
FIG. 3*b* shows a cross section through the partial plan view of FIG. 3*a;*

A difference between the operation of the integrated light guide and window 200 and the separate prior art light guide 120 of FIG. 2 is that in the prior art light guide, the light was distributed downwards through the body of the light guide itself. In the combined window and light guide 200, the light is directed downwards from a surface of the element 200 without passing through the body of the element as previously.

Since the light source is now located slightly below the light guide surface when compared to the prior art light guide, a slightly different structure of grating is required. For other relative arrangements of light source and light guide, different structures of grating may be used.

Figure 5A:
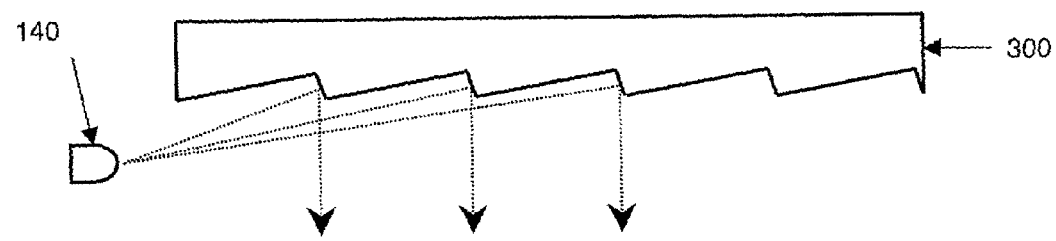
FIG. 5*a* shows an embodiment according to the invention.

The grating of FIG. 5*a* comprises a series of angled protrusions resembling a sawtooth pattern. Each protrusion is generally triangular, with one sharply-sloped side, and one more gently-sloped side. The functioning of this pattern is broadly similar to the functioning of the previously described grating, although in this case, the light from the grating surface is distributed downwards without passing through the body of the light guide. This can be seen from the illustrated light paths shown as dotted lines in FIG. 5*a*. The light emitted from LED 140 hits the steeper face of the sawtooth pattern and is reflected downwards towards the LCD, thus illuminating it.

Figure 5B:
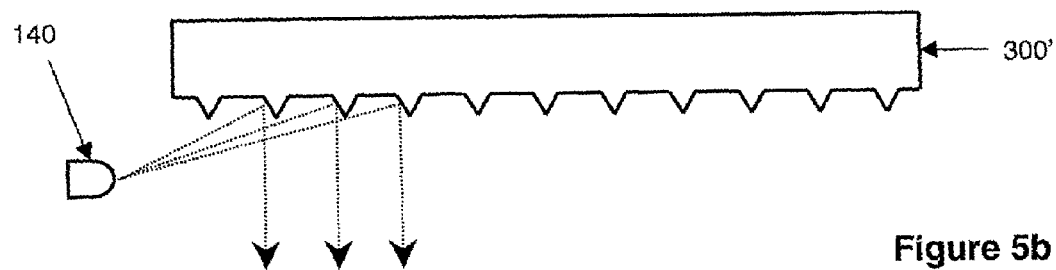
FIG. 5*b* shows another embodiment according to the invention.

Another alternative form of the grating is shown in FIG. 5*b*. This embodiment has a series of triangular protrusions projecting from the inner surface of the display window, in a similar manner to those of FIG. 5*a*. The exact choice of form for the protrusions is a matter of design choice and not critical to the operation of the display window.

The light emitted from the light source is distributed downwards when it encounters one of the steeper faced sides of the triangular projections. The light reflected from the LCD which must pass upwards to the user suffers minimal degradation from such a structure.

The grating described is merely exemplary, and the skilled person will be aware of other forms for the grating which will perform the required function of illuminating the LCD.

In many instances, it is desirable to provide more than a single light source. This is especially true for the larger displays found in many personal organisers or laptop computers.

Figure 6:
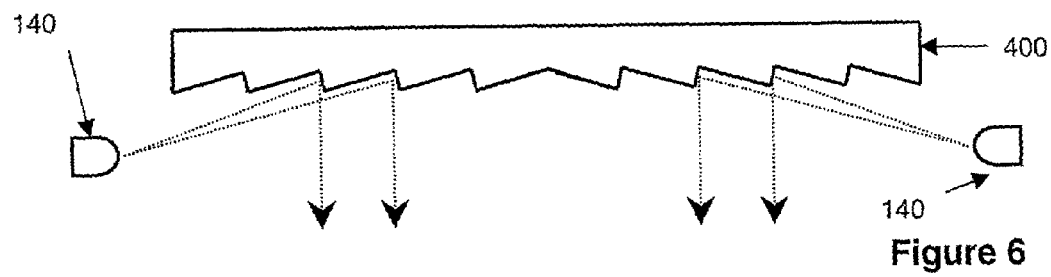
FIG. 6 shows a still further embodiment according to the invention.

In such cases, a display window 400 as shown in FIG. 6 may be provided. This cross sectional view shows how the display window, incorporating the grating for directing illumination towards the LCD, may be used with a pair of light sources 140 disposed on opposite sides of the window 400.

The basic mode of operation of this embodiment is as described above in relation to the embodiment of FIG. 5*a*, but in this case, the grating is not disposed uniformly across the width of the display window 400. Instead, the pattern is made to be generally symmetrical about a line running along the centre of the display window 400. In this way, each half of the window of FIG. 6 can be considered to be operable in an identical fashion to the display window of FIG. 5*a*, which uses a single source of illumination.

Figure 7:
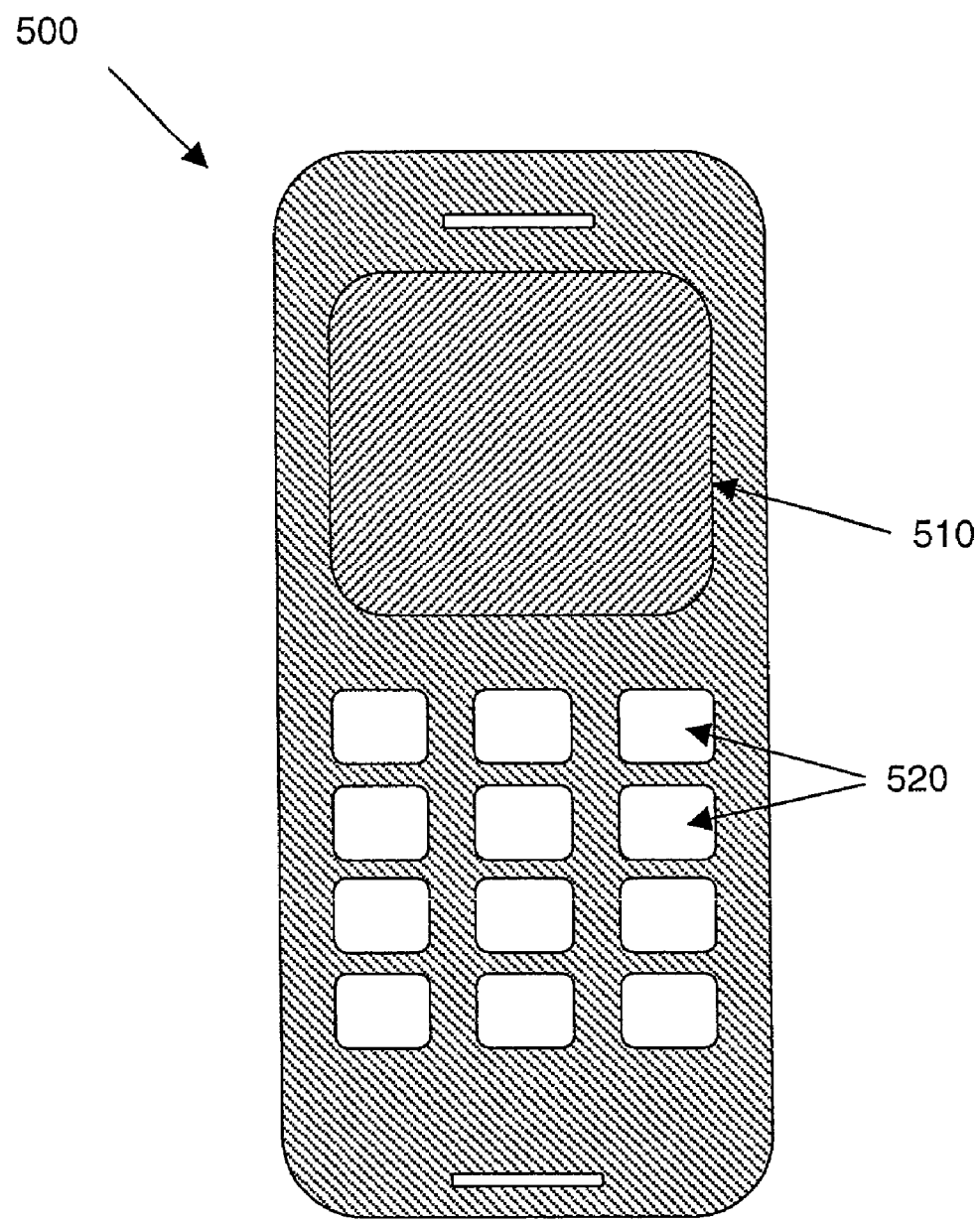
FIG. 7 shows a portable telephone according to an embodiment of the invention.

Another embodiment of the invention is shown in FIG. 7. In this case, the display window incorporating a grating for light distribution is formed as part of a portable telephone housing 500. The housing is not intended to be removable by a user, as this would expose the grating to possible sources of damage.

The housing 500 is manufactured by a known method such as moulding. The material of construction is any plastics material which may be moulded. The housing 500 has several apertures 520 which define locations for keys of the keypad, an earpiece and a loudspeaker, for instance.

The display window 510 is integrally formed with the housing and is a clear plastics window as previously described. It may be formed as part of the moulding process, or it may be produced separately and then integrated with the housing. In the latter case, the process of producing the grating may be performed before or after integration as required.

The housing of the telephone, once produced, is attached to the main body of a telephone such that the keys of the keypad protrude through the apertures 510. In this configuration, the display window directly overlies an LCD which is attached to the main body of the telephone. Associated with the LCD, and forming part of the main body of the telephone, is a light source which may comprise one or more LEDs or other suitable devices. The LEDs are so positioned that when the housing 500 is attached, they shine into the gap between the display window and the LCD. The grating on the interior surface of the display window 510 directly faces the LCD with no intervening layer of material. This is as shown in FIG. 4.

Once the housing 500 is secured in place, using screws or similar fasteners, the grating is safely positioned so that it may not be damaged by contact with any possible sources of harm.

The display assembly is effectively split between two separate parts—the front cover 500, and the main body of the telephone. Bringing these two parts together completes the display assembly and finalises the structure of the entire telephone. There is no need to worry about the addition of a separate gasket and light guide as would have been required with prior art solutions.

In use, the combined display window and grating 510 functions in the manner which has already been described.

The present invention has been particularly described in relation to its use in portable telephones, but it is equally applicable to any device using a front-lit display assembly. Another form of display amenable to being front-lit is the Zenithal Bistable Display (ZBD).

The present invention includes any novel feature or combination of features disclosed herein either explicitly or any generalisation thereof irrespective of whether or not it relates to the claimed invention or mitigates any or all of the problems addressed.

What is claimed is:

1. A display assembly comprising:
    a display;
    an illumination source; and
    a window disposed adjacent the display, and through which the display is viewable, wherein an outer surface of the window facing the display is provided with an incorporated grating for distributing light from the illumination source in the direction of the display without light passing through the window.

2. A display assembly as claimed in claim 1 wherein the display is a Liquid Crystal Display (LCD).

3. A display assembly as claimed in claim 2 wherein the LCD is operable in reflective mode.

4. A display assembly as claimed in 1 wherein the illumination source is disposed between the window and the display.

5. A display assembly as claimed in claim 1 wherein the illumination source is one or more Light Emitting Diodes (LEDs).

6. A display assembly as claimed in claim 1 wherein the grating comprises a plurality of grooves.

7. A display assembly as claimed in claim 1, comprising a first part and a second part wherein the window is comprised in to first part of the assembly and the illumination source is comprised in the second part.

8. A display assembly as claimed in claim 1, wherein the incorporated grating has a non-uniform, symmetric distribution for distributing light.

9. A display assembly as claimed in claim 1, comprising a further illumination source wherein the incorporated grating has a non-uniform, symmetric distribution for distributing light from the illumination sources.

10. A display assembly as claimed in claim 1, wherein the grating of the window is in the form of a surface comprising a plurality of triangular projections.

11. A display assembly as claimed in claim 1, wherein another outer surface of the window for exposure to a user is provided with a toughened coating.

12. A display assembly as claimed in claim 1, wherein another outer surface of the window for exposure to a user is provided with an anti-reflective coating.

13. A portable telephone comprising:
a housing;
a light source; and
a display,
wherein the housing comprises a window with first and second outer surfaces, wherein the first outer surface defines an exterior surface at the portable telephone and the second outer surface, which faces the display, is provided with an incorporated grating for distributing light from the light source onto the display without the light passing through the window.

14. A portable telephone as claimed in claim 13 wherein the housing is a front cover of the telephone.

15. A portable telephone as claimed in claim 13 wherein the window is integrally formed wit the housing.

16. A display assembly comprising:
a display;
an illumination source; and
a window having an outer surface disposed adjacent the display without an intervening layer of material therebetween, and positioned to define a gap between the outer surface and the display, the display being viewable through the window, wherein the outer surface of the window faces the display and is provided with an incorporated grazing for distributing light from the illumination source, wherein when light is shone directly into the gap the grating distributes the light in the direction of the display without the light passing through an intervening layer of material.

17. A display assembly as claimed in claim 16, comprising a first part and a second part wherein the window is comprised in the first part of to assembly and the illumination source is comprised in the second part.

18. A display assembly as claimed in claim 16, comprising a further illumination source wherein the incorporated grating has a non-uniform, symmetric distribution for distributing light from the illumination sources.

19. A portable telephone comprising a display assembly as claimed in claim 16, wherein a further outer surface of the window defines an exterior surface of the portable telephone.

20. A unitary display window for placement in registration with a display so that the display is viewable through the window, wherein a first outer surface of the window is for exposure to a user, and a second outer surface of the window is for placement adjacent the display, the second outer surface being provided with an incorporated grating to distribute light from an associated external source of illumination in the direction of the display without light passing through the window.

21. A display assembly comprising a display window as claimed in claim 20, comprising a display and an illumination source.

22. A portable telephone comprising a display assembly as claimed in claim 21, wherein the first outer surface of the display window defines an exterior surface of the portable telephone.

* * * * *

UNITED STATES PATENT AND TRADEMARK OFFICE
CERTIFICATE OF CORRECTION

PATENT NO. : 7,113,232 B2  Page 1 of 1
APPLICATION NO. : 10/023732
DATED : September 26, 2006
INVENTOR(S) : Sladen It is certified that error appears in the above-identified patent and that said Letters Patent is hereby corrected as shown below:

Column 7,

Line 11, "to" should read --the--;

Line 44, "wit" should read --with--.

Column 8,

Line 10, "grazing" should read --grating--;

Line 17, "to" should read --the--.

Signed and Sealed this

Twenty-seventh Day of February, 2007

JON W. DUDAS
*Director of the United States Patent and Trademark Office*